Aug. 26, 1924.
G. A. LOUGH
1,506,650
DRYING APPARATUS
Filed Nov. 29, 1920    3 Sheets-Sheet 3
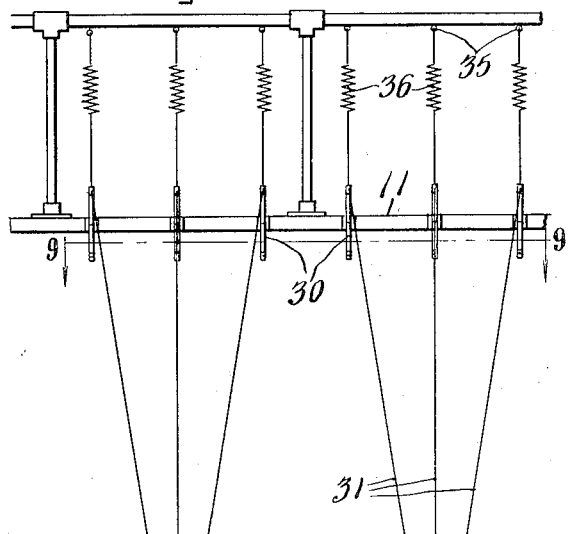
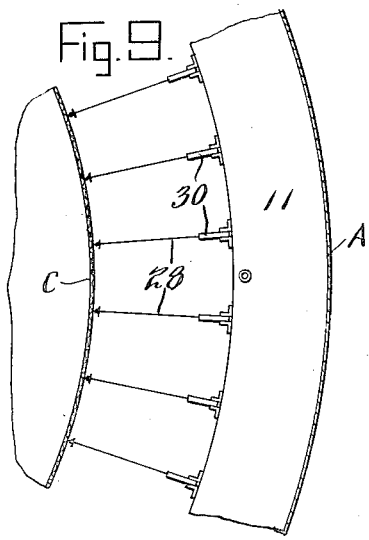
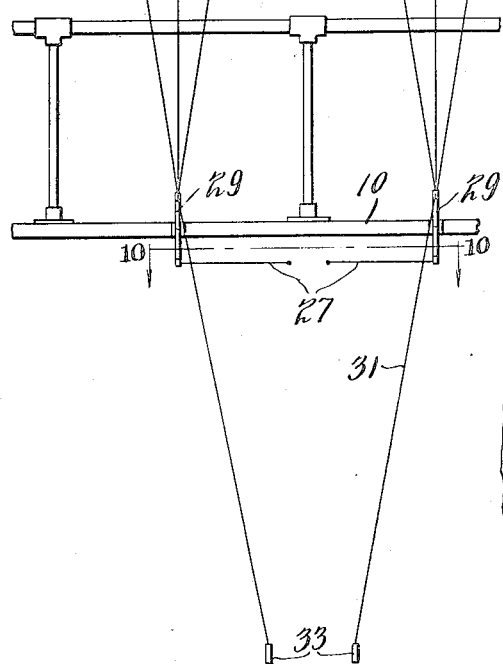
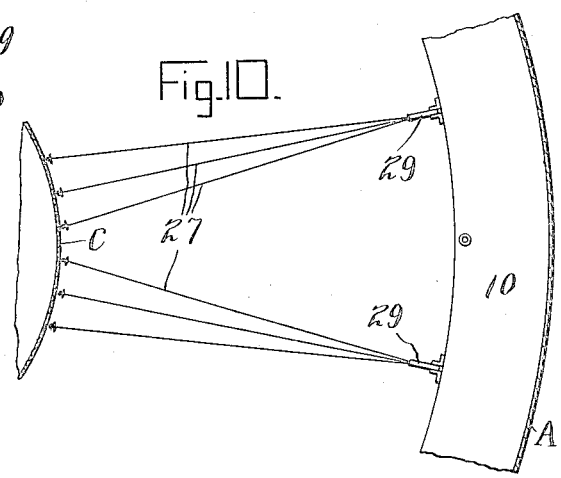
Inventor
Gerald A. Lough
By
Attorney Patented Aug. 26, 1924.

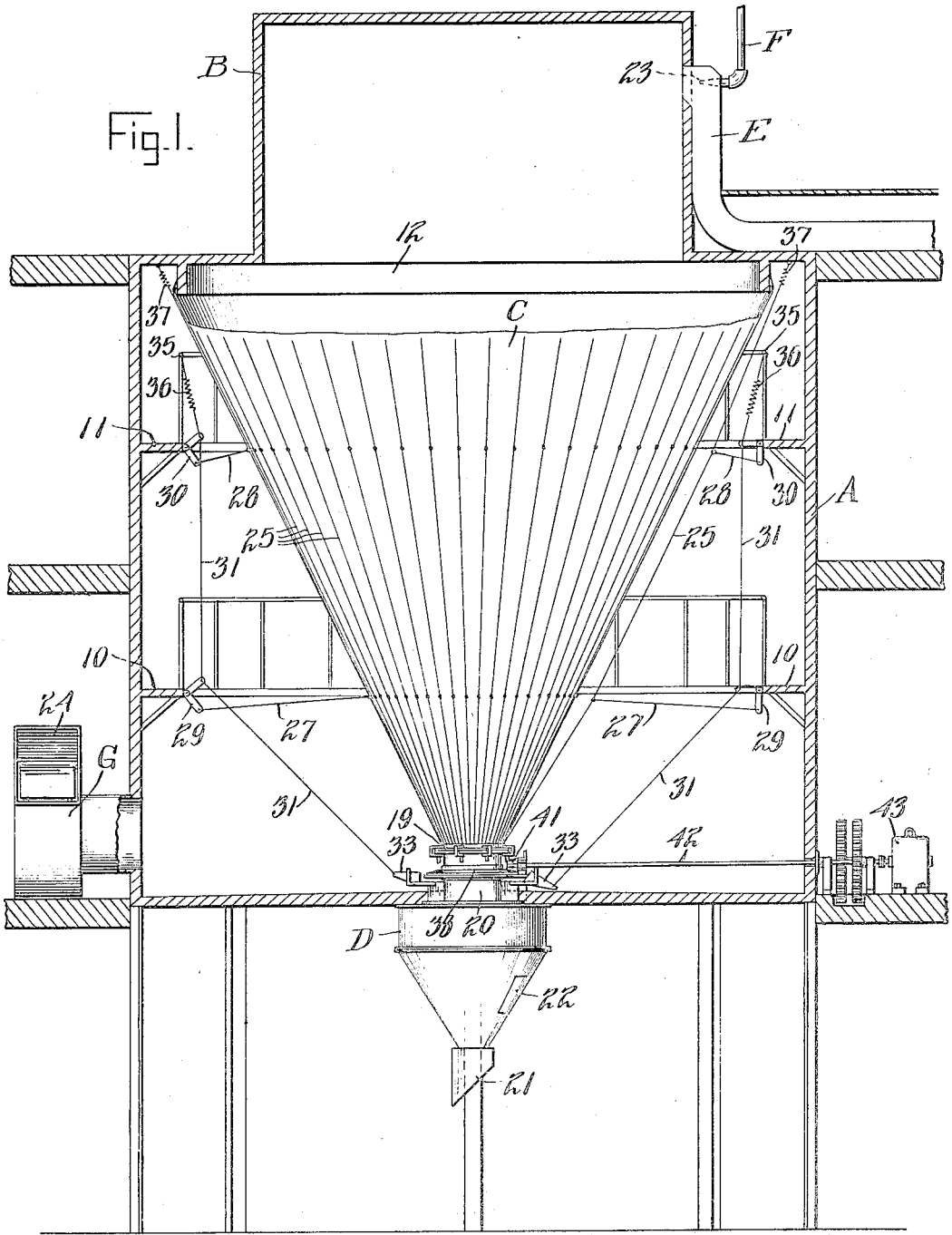

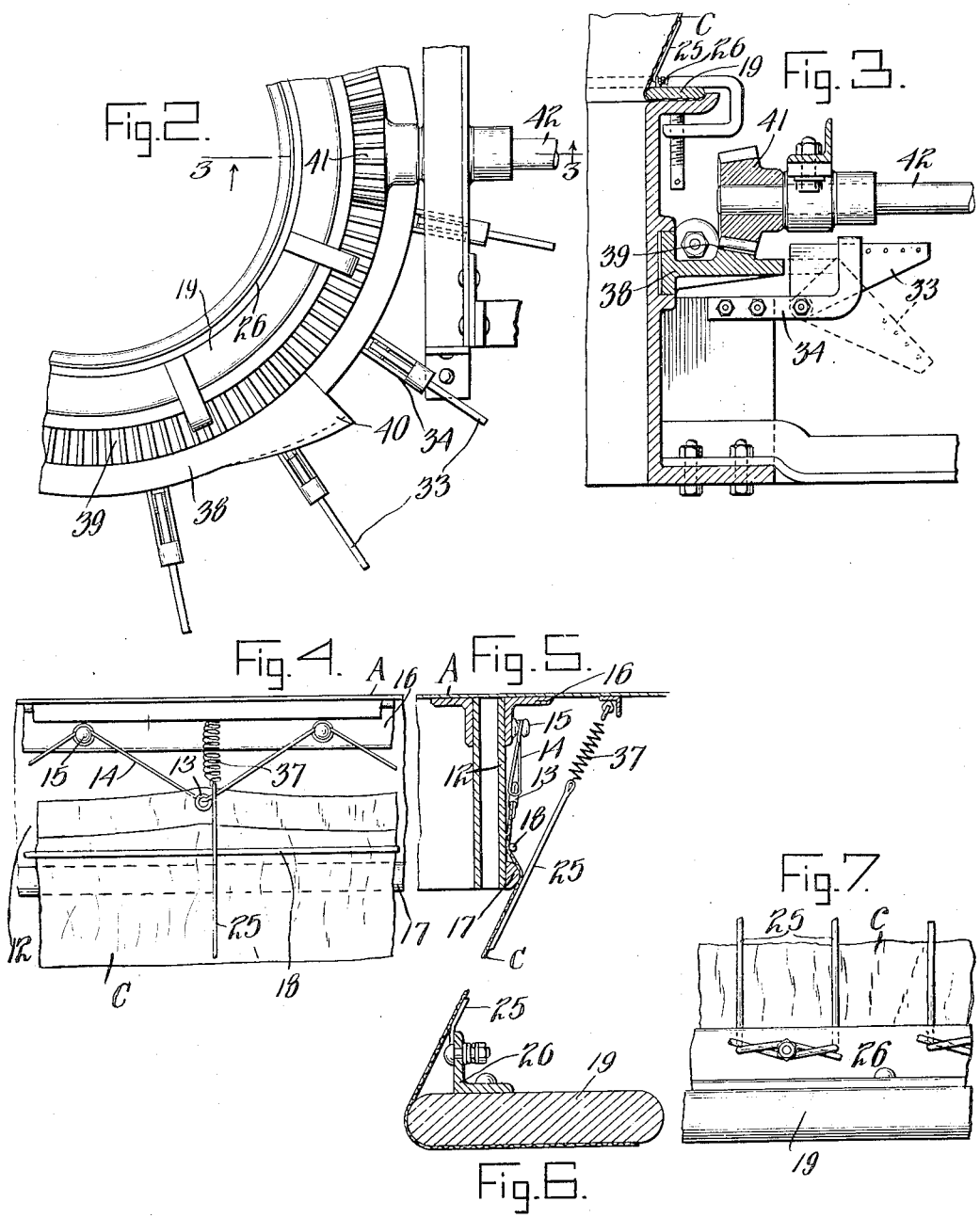

1,506,650

UNITED STATES PATENT OFFICE.

GERALD A. LOUGH, OF PLAINFIELD, NEW JERSEY.

DRYING APPARATUS.

Application filed November 29, 1920. Serial No. 427,149.

*To all whom it may concern:*

Be it known that I, GERALD A. LOUGH, a citizen of the United States, residing at Plainfield, in the county of Union and State of New Jersey, have invented certain new and useful Improvements in Drying Apparatus, of which the following is a specification.

My said invention consists in an improved process for recovering in powdered form the solids contained in liquids or semi-liquids and it relates particularly to such process and an apparatus for practicing the same wherein the product to be dried is atomized or sprayed into a heated chamber and the water content thereof eliminated by evaporation, the products of evaporation being exhausted in one direction and the dried or powdered product in another direction, all as will be hereinafter more fully described and claimed.

Referring to the accompanying drawings which are made a part hereof and on which similar reference characters indicate similar parts, Figure 1 is a sectional view through an apparatus embodying my said invention, certain parts thereof being shown in elevation, and Figure 2, a fragmentary plan of the lever operating mechanism shown near the bottom of Figure 1, Figure 3, a section on line 3—3 of Figure 2, Figure 4, a fragmentary side elevation of the upper part of the screen shown in Figure 1, Figure 5, a vertical section through said screen showing the attaching means at the upper end of the same, Figure 6, a vertical section through said screen showing the attaching means at the lower end of the same, Figure 7, a view similar to Figure 4 of the lower part of the screen, Figure 8, a fragmentary elevation similar to Figure 1 showing on an enlarged scale the beating wires and their connections, Figure 9, a section on line 9—9 of Figure 8, and Figure 10, a section on line 10—10 of Figure 8.

In said drawings, the portions marked A represent the walls of the powder separating chamber or drying room. B the walls of the spray chamber superimposed upon chamber A, C a screen, D a receiving hopper, E a heated air conduit, F an inlet pipe, and G an exhaust fan.

The chamber or room A will be made of such dimensions as may be required for the particular purpose and capacity for which the apparatus is intended. As shown, it is provided with two platforms or balconies 10 and 11 positioned as will be most convenient for reaching all parts of the apparatus for adjustments, repairs or observation. The room or chamber is preferably circular but may, of course, be rectangular if desired, and is made of any material found desirable or appropriate.

The spray chamber B is mounted upon the top of chamber A and is preferably of rectangular dimensions. Its underside opens into the top of chamber A, the two in effect forming one continuous chamber.

The screen C is of fabric secured at its upper end to an annular flange 12 depending from the top of chamber A and so positioned as not to obstruct the opening into chamber A from the underside of chamber B. Said screen is attached to said flange in a manner best shown in Figures 4 and 5. The upper edge of the fabric is formed with eyelets 13 through which is threaded a cord 14 which passes around studs or buttons 15 secured near the upper edge of said annular flange or rim 12. Said flange 12 is preferably constructed as best shown in Figures 4 and 5, connected to the top of the chamber A at its upper edge by angle-irons 16. A ring 17, semi-circular in cross section, is preferably formed or mounted on the lower edge of said rim 12 over which the fabric C is stretched and a rope or other binder 18 is secured around the structure above said ring 17 to assist in holding the fabric in position and taut. The lower end of the fabric is securely clamped between a metal ring 19 and a flange on the top of the neck 20 which leads into the hopper D. Said hopper D is provided with a discharge gate 21 and preferably has a door 22 in its side through which access may be had for cleaning said hopper.

The heated air conduit E leads from any source of supply and the inlet pipe F is connected with the supply of liquid which it is desired to subject to treatment and terminates in a spray nozzle 23 of a type adapted to introduce the product in an atomized form within chamber B. One or more spray nozzles appropriately spaced from each other may be used as will be understood. The fan G may be driven from any source of power and is mounted to connect with the lower side of chamber A outside of the screen C and has a discharge opening 24, as shown.

A series of wire beaters 25 are rigidly connected at their lower ends to bolts secured in a flange of an angle-iron 26 which surrounds the neck 20, being secured on the top face of ring 19 under which the lower end of the fabric of which said hopper is composed (see particularly Figures 3 and 6) is clamped. Said wires 25 are connected by flexible connections 27 and 28, respectively, to one end of bell-crank levers 29 and 30 pivoted on the edge of the balconies 10 and 11, respectively. The other arms of said bell-crank levers are connected by flexible connections 31 to pivoted trips 33 mounted in brackets 34 and around the neck or spout 20 leading to the hopper D. The upper ends of wires 31 are connected at points 35 and are provided with coil springs 36 interposed between said connections 35 and the connection with the upper bell-crank levers 30. Each of the beater wires 25 is also provided with a coiled spring 37 near its upper end.

A ring 38 having gear-teeth 39 in its upper face and provided with cams 40 on its edges, is mounted to rotate in a way formed around the neck 20. A pinion 41 mounted on a shaft 42 driven by a motor 43 is adapted to engage with the teeth in ring 38 and drive the same. As said ring rotates said cams 40 will engage successively with the pivoted dogs 33 and throw them down from the position shown in whole lines in Figure 3 to the position shown in dotted lines and as the point of each cam passes the edges of said dogs, successively, the springs 37 will snap the wires against the sides of the hopper and operate to jar the material adhering to the inside thereof so that it will fall down into hopper D. This arrangement operates to bring the wires one after another against the sides of the screen with a slapping or beating effect so that the interior surface of the screen is continually being jarred free of any material that may adhere thereto.

The fan G operates to create a strong suction, drawing the heated air, laden with the dry or powdered product of the sprayed substance coming through nozzle 23, down into screen C, the suction serving to draw the vapor through said screen and discharge it through said suction fan, while the solids are discharged through neck 20 into hopper 22.

By this apparatus, it is possible to obtain recovery of substantially all the solids of the substance to be dried in a single chamber and with an apparatus comparatively simple and inexpensive. All of the product is conveyed to a restricted point of discharge and becomes uniformly mixed instead of being delivered at successive points of discharge, as in other apparatus for such purposes, requiring subsequent mixing of the product because of varying degrees of fineness at the several points of discharge. Unnecessary handling and mixing of the product is thus avoided.

It will also be noted that in the operation of this apparatus the air is delivered at its maximum temperature where the spray is densest and most heavily laden with solids and that the temperature decreases as the moisture is absorbed. In operation the high temperatures are all at the top of the chamber, where the product is introduced and where rapid evaporation will take place, thus the product will suffer less from such high temperature, and a higher grade product result. The product travels from this high temperature zone downward through a zone steadily and constantly growing cooler and as the water content is being evaporated, and is all collected from the coolest part of the chamber, uniformly mixed making a product of the same grade and quality throughout the bulk thereof.

It will be understood, of course, that in many of the details the construction shown is only for the purpose of illustrating an operative apparatus or one capable of enabling the process to be practiced and that many modifications may be made without departing from the spirit and purpose of my invention. For example, the means for beating the screen, or shaking the material free from its interior surface, may be of any arrangement found appropriate, although I regard the construction shown as very desirable and efficient for the purpose. Other means, however, such, for example, as illustrated in my two co-pending applications may be found equally efficient and may be used in connection with the type of apparatus herein illustrated as well as with the particular type shown in said other applications. Also, the screen instead of being conical may be cylindrical or of any other form desired and where available space will not permit of the construction illustrated chamber B may be placed on substantially the same level with chamber A with a suitable connection. These and many other modifications may be made, the invention being defined by the appended claims.

Having thus fully described my said invention, what I claim as new and desire to secure by Letters Patent, is:

1. A drying apparatus of the character described comprising a drying chamber, means for introducing the product to be dried and heated air at the top of said chamber, a cone-shaped screen mounted with its point extending toward the bottom of said chamber, a discharge for the dried product from the bottom of said screen, beaters about the screen, a circular series of levers about the discharge outlet connected to said beaters, and means rotating about said outlet to actuate said levers in succession, substantially as set forth.

2. A drying apparatus of the character described, comprising a drying chamber, a cone-shaped screen separating said drying chamber into two parts, the point of said screen being at the bottom of said chamber and adapted to discharge the dried product, means for introducing the product to be dried and the heated air above said screen, a suction fan connected with said chamber near the bottom thereof and outside of said screen, and means for jarring said screen to free it from product adhering thereto, substantially as set forth.

3. A drying apparatus of the character described comprising a chamber, a cone-shaped screen dividing said chamber, means for introducing the product to be dried and the heated air above said screen, an exhaust for the vapor outside of said screen, beaters arranged to beat against the outside of said screen for freeing the interior surface of the product, means for operating said beaters, and a hopper below said screen for receiving said product from the lower end thereof, substantially as set forth.

4. A drying apparatus of the character described comprising an inverted chamber, a cone-shaped screen dividing said chamber, means for introducing the product to be dried and the heated air above said screen, an exhaust for the vapor outside of said screen, beaters arranged about the screen to beat against the outside of the same for freeing the interior surface of the product, means for operating said beaters in succession, and a hopper below said screen for receiving said product from the lower small end thereof, substantially as set forth.

5. A drying apparatus of the character described comprising an inverted chamber, a cone-shaped screen dividing said chamber, means for introducing the product to be dried and the heated air above said screen, an exhaust for the vapor outside of said screen, beaters arranged about the screen to beat against the outside thereof for freeing the interior surface of the product, means for operating said beaters in succession, and a hopper below said screen for receiving said product from the lower end thereof, substantially as set forth.

6. A drying apparatus comprising a circular chamber, a screen concentric therewith, means to introduce air and a spray of material to be dried within the screen, means to withdraw air and vapor through the screen, beaters arranged about the screen and mechanically operated means for operating the beaters continuously in continuous succession, substantially as set forth.

7. A drying apparatus comprising a circular chamber, a screen concentric therewith, means to introduce air and a spray of material to be dried within the screen, means to withdraw air and vapor through the screen, beaters arranged about the screen and means revolving around the screen and operating said beaters in succession, substantially as set forth.

8. A drying apparatus comprising a circular chamber, a screen concentric therewith, means to introduce air and a spray of material to be dried within the screen, means to withdraw air and vapor through the screen, beaters arranged about the screen, beater wires adjacent the screen, means to draw the wires away from the screen and means for causing them to strike back sharply against the screen, substantially as set forth.

9. A drying apparatus comprising a circular chamber, an inverted screen concentric therewith, means to introduce heated air and a spray of material to be dried within the screen, means to withdraw air and vapor through the screen, beaters arranged about the screen, beater wires running lengthwise of the screen, means connected to the wires between their ends to withdraw them from the screen, and springs for causing them to strike back sharply against the screen, substantially as set forth.

10. A drying apparatus of the character described comprising an upper chamber, a lower separating chamber, an inverted conical screen in the lower chamber having a restricted outlet at its lower end, means to withdraw air and vapor through the screen and means to impart a jarring action to the screen at a plurality of points about its circumference in continuous succession in one direction, substantially as set forth.

11. A drying apparatus comprising a circular chamber, a screen concentric therewith, means to introduce air and a spray of material to be dried within the screen, means to withdraw air and vapor through the screen, beaters arranged about the screen, and mechanically actuated means for operating the beaters progressively, substantially as set forth.

12. A drying apparatus of the character described comprising a circular chamber, a concentric screen therein, means to admit air and a spray of material to be dried into the chamber at one side of the screen, means to withdraw air and vapor through the screen, beaters arranged at the other rear side of the screen, and mechanically actuated means to operate the beaters continuously in progression, substantially as set forth.

In witness whereof, I have hereunto set my hand and seal at New York, New York this 20th day of November, A. D. nineteen hundred and twenty.

GERALD A. LOUGH. [L. S.]

Witness:
LAURA E. SMITH.